Aug. 28, 1956     M. BREGMAN     2,760,273
METHOD AND APPARATUS FOR LOCATING SHEETS
Filed July 6, 1955     2 Sheets-Sheet 1

INVENTOR.
MILTON BREGMAN
BY Mock & Blum
ATTORNEYS

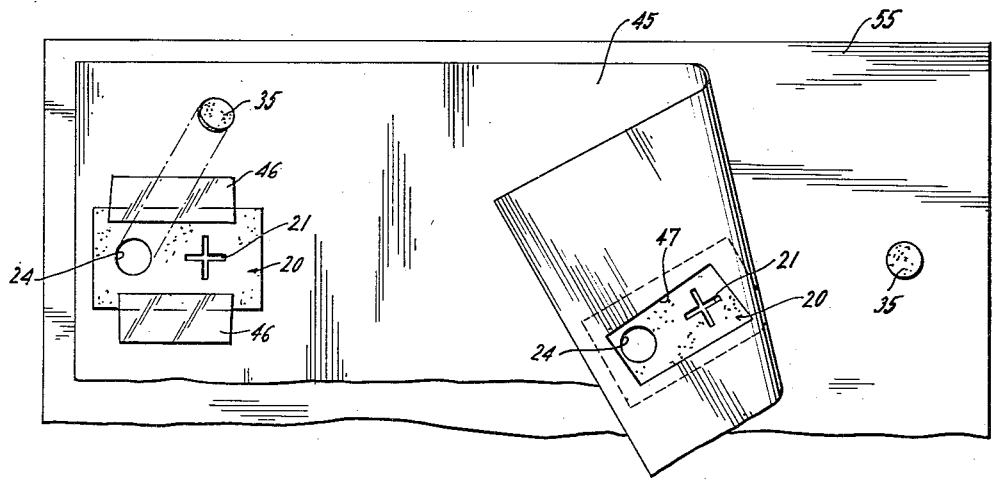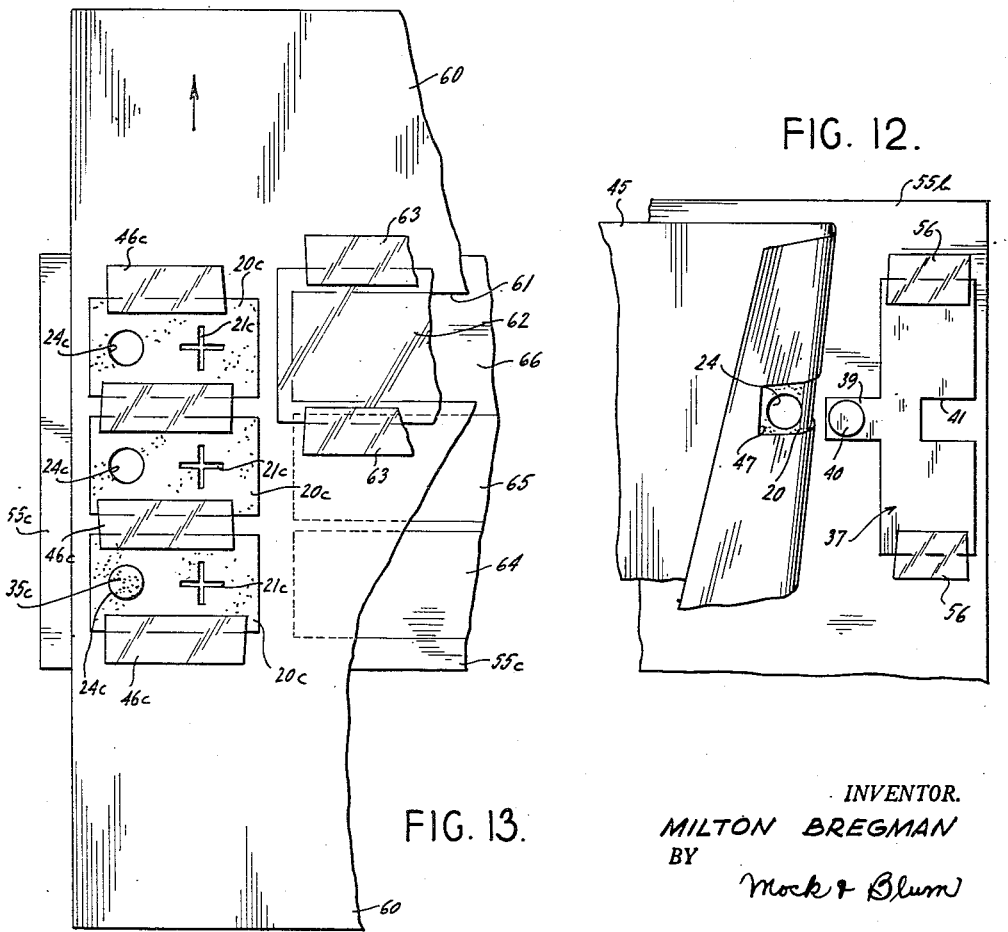

United States Patent Office 2,760,273
Patented Aug. 28, 1956

2,760,273

METHOD AND APPARATUS FOR LOCATING SHEETS

Milton Bregman, New York, N. Y.

Application July 6, 1955, Serial No. 520,300

15 Claims. (Cl. 33—184.5)

This invention relates generally to a method and apparatus for locating sheets, such as for printing, photographic, drafting and other purposes.

Heretofore, considerable difficulty has been experienced in accurately superimposing and registering sheets, both with each other and with a reference surface, as in photo-printing, photo-engraving, drafting and the like. Problems are also often encountered in step locating or successively shifting of sheets relative to a reference surface, as for example in photo-engraving when it is desired to make a plural reproduction.

Accordingly, it is a general object of the present invention to provide a novel method and apparatus wherein sheets may be simply, accurately, and efficiently located in simultaneously superimposed relation with respect to each other, sequentially superimposed relation with respect to a reference surface, and in successively shifted or stepped relation with respect to a reference surface. Further, the method and apparatus of the instant invention enable such sheet locating to be quickly and easily accomplished by persons of only ordinary skill and dexterity so as to effect substantial savings in labor costs.

It is another object of the present invention to provide new and improved sheet locating apparatus for use in practicing the instant method, which apparatus is very simple in construction and inexpensive to manufacture, and automatically insures an extremely high degree of accuracy under all conditions.

It is an additional object of the present invention to provide a sheet locating method and apparatus for use therewith, wherein register marks may be automatically produced on a surface, as on the surface of a photo-engraved plate for printing press registration.

Other objects of the present invention will become apparent upon reading the following specification and referring to the accompanying drawings, which form a material part of this disclosure.

The invention accordingly consists in the features of construction, and combinations and arrangements of elements and method steps, which will be exemplified in the following description, and of which the scope will be indicated by the appended claims.

In the drawings:

Fig. 11 is a plan view showing a later step in the instant method, wherein a sheet is being located on a reference surface;

Fig. 12 is a partial plan view showing the stage of Fig. 11, but illustrating the use of modified apparatus; and Fig. 13 is a partial, plan view illustrating the step locating procedure of the instant invention.

Figure 1:
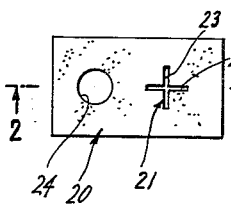
Figure 1 is a plan view showing a register tab of the present invention.
Figure 2:
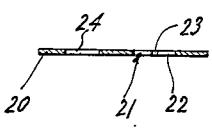
Fig. 2 is a longitudinal sectional view taken substantially along the line 2—2 of the tab of Fig. 1.

Referring now more particularly to the drawings, and specifically to Figs. 1 and 2 thereof, the article illustrated therein comprises a register tab, generally desginated 20, which may be of substantially rectangular configuration and fabricated of relatively stiff, self-sustaining, but flexible sheet material. In practice, the tab 20 may be fabricated of fibrous material, such as paperboard, plastic, or other suitable substances. Formed in the tab 20 is a cutout or perforation 21, which is preferably configured as a cross or other conventional register mark. In the illustrated embodiment the perforation 21 is formed of a pair of perpendicular, intersecting slits 22 and 23. Spaced from the perforation 21, the tab 20 is formed with another perforation 24 of any suitable shape, and preferably circular, as illustrated.

Figure 3:
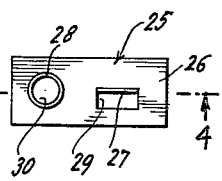
Fig. 3 is a plan view showing a positioning member or pin of the present invention.
Figure 4:
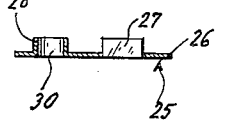
Fig. 4 is a longitudinal sectional view taken substantially along the line 4—4 of the positioning member of Fig. 3.

The positioning member or pin of Figs. 3 and 4 is generally designated 25, and is preferably fabricated of relatively thin, sheet metal, but may be formed of plastic or other material, as desired. The positioning member includes a generally rectangular, substantially flat base plate 26. Projecting from one surface of the base plate 26 are a thin rib or flange 27 and a boss or tube 28. More particularly, the base plate 26 is struck up to define a generally rectangular, upstanding blade or rib 27, and leaving a rectangular hole 29 in the base. The rib 27 is preferably of a length just slightly less than that of the tab slit 22 and of sufficient thickness to frictionally engage in the latter slit. The tubular boss 28 may also be struck up from the base plate 26, thereby leaving a hole 30, through the boss and is arranged in spaced relation with respect to the rib 27 and of a size to frictionally engage through the tab opening or aperture 24 when the rib is received in the tab slit 22. It is appreciated that the base plate openings 29 and 30 may be eliminated or closed, if desired.

Figure 5:
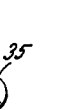
Fig. 5 is a plan view showing another type of positioning member or locating button for use in practicing the instant invention.
Figure 6:
Fig. 6 is a side elevational view of the positioning member or button of Fig. 5.

The locating member or button of Figs. 5 and 6, generally designated 35 consists of a substantially flat, relatively rigid piece, shaped for snug, conforming engagement in the tab opening 24. Hence, the button 35 is of circular or disc-like configuration in the illustrated embodiment. One face of the locating button 35 is preferably provided with pressure-sensitive or other adhesive material; or, the button may be secured to an adhesive sheet (not shown).

Figure 7:
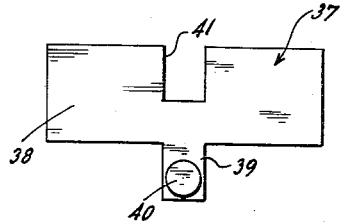
Fig. 7 is a plan view showing a slightly modified form of positioning or locating member.
Figure 8:
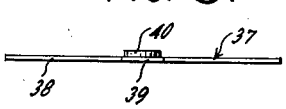
Fig. 8 is an elevational view showing the locating member of Fig. 7.

Figs. 7 and 8 illustrate an alternative form of locating member 37, which includes a generally rectangular, relatively rigid, sheet-like body 38, and a preferably integrally formed coplanar extension strip 39. The extension strip 39 is sufficiently long so as to carry a flat disc or button 40 fixed on one face and disposed entirely outwards of the body 38. The locating member 37 of Figs. 7 and 8 may be preferred under certain conditions for its relative bulk and ease of handling, Figs. 5–8 being substantially actual size. Further, the locating member 37 is preferably fabricated of sheet metal, and may be formed in a single stamping operation, the notch 41 in the body 38 providing material for the extension strip 39 of another locating member, and the button or disc 40 being upset from the material of the extension strip.

Figure 9:
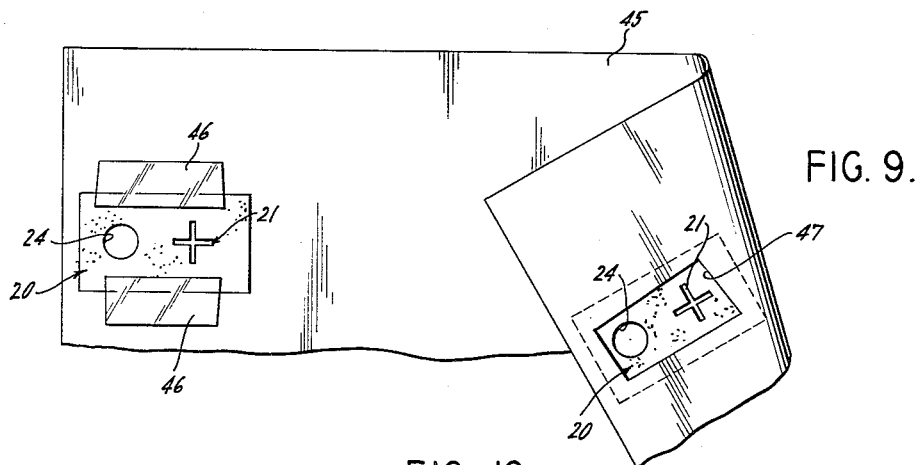
Fig. 9 is a plan view showing a sheet provided with locating means in accordance with the present invention.

As is well known in photomechanical reproduction, drafting, color photography processing, and in other like operations, it is frequently desired to accurately locate a plurality of sheets in superposed relation. One such sheet, is represented at 45 in Fig. 9, and in accordance with the invention is provided with a pair of tabs 20, 20 fixedly secured to one face of the sheet, as by adhesive strips or tape 46. More particularly, the tabs 20 are arranged on the sheet 45 in any desired relation; and the tabs may be disposed to place the perforations 21 in registry with existing register marks, or where it is desired to place register marks. In the region of each tab 20, the sheet 45 is cut away to form an aperture or opening 47 underlying the adjacent tab. The shape and size of the apertures 47 are not critical, it being essential only that the tab perforations 21 and 24 open through the apertures.

Figure 10:
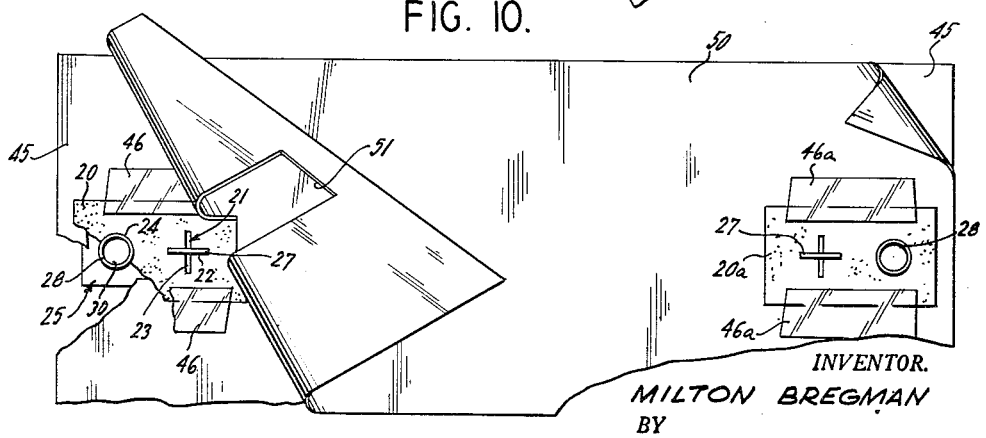
Fig. 10 is a plan view showing an intermediate step in the method of the instant invention, wherein a second sheet is being provided with locating means.

A positioning member or pin 25 may thus be disposed below each of the tabs 20 with the rib 27 and boss 28 projecting upwards in spaced relation through the sheet openings 47 and snugly through the tab perforations 21 and 24, as seen in Fig. 10. As the rib 27 and boss 28 are frictionally held in the tab perforations, the positioning member 25 retains itself in assembled relation with the tabs, but may be removed therefrom by slight manual effort.

A second sheet 50, which it is desired to align or locate with respect to the first sheet 45 is superimposed upon the latter in registry therewith or other desired relation, as seen in Fig. 10. A sheet opening or cutout 51 is formed in the sheet 50 in the region of each tab 20, and of such a size and shape as to expose the tab perforations 21 and 24 and spacedly receive the positioning member projections 27 and 28. On the upstanding projections of each positioning member 25, and covering the adjacent sheet opening 51, is a tab 20a which may be identical to the underlying tab 20. The tabs 20a are fixedly secured to the sheet 50 by any suitable means, such as adhesive tape 46a. In this manner, the superposed sheets 44 and 45 are retained in their properly located relation. It is, of course, understood that the left hand side of Fig. 10 shows the sheet opening 51 prior to securement of a tab 20a.

Additional sheets may be superposed on the sheets 45 and 50 in the same manner as described hereinbefore. However, the two sheets will suffice to illustrate the operation.

The positioning members 25 may be removed from the superposed sheets 45 and 50 by withdrawal of the ribs 27 and bosses 28 from the tab perforations 21 and 24. Slight flexing of the tabs while depressing the bosses 28 will facilitate removal of the positioning members.

The sheets 45 and 50 may now be realigned or located at any time in their desired superposed relation by re-engagement of the positioning members 25 through the tabs 20.

In Fig. 11 is illustrated a further procedure of the present invention, wherein the sheets 45 and 50, provided with locating means as described hereinbefore, may be superposed in their aligned or registering relation on a reference surface or plate 55. More specifically, the sheets 45 and 50 may be superposed on the reference surface 55 in their desired alignment either simultaneously or sequentially, as required. This is readily accomplished by placing one of the sheets, say sheet 45, on the reference surface 55 and engaging an adhesive coated button 35 conformably through each tab aperture 24 against the plate surface. The buttons 35 will thus be fixed to the surface 55 with their spacing equal to the spacing between the tab apertures 24 of the sheets to be located. The remaining sheets may then be successively placed on the surface 55 with their circular tab apertures snugly and conformably receiving the fixed buttons, to thereby accurately locate the successive sheets with respect to each other and the reference surface.

Further, the surface 55 may be photographically sensitized, as for photoengraving, and register marks may be photoengraved on the reference surface by exposure of the latter through the tab perforations 21.

Due to the relatively small size of the locating buttons 35, the locating member 37 may often be advantageously employed. Fig. 12 illustrates the use of the locating member 37 fixed in position on a reference surface 55b by adhesive tape 56. The superimposing or locating operation is essentially the same with either the locating buttons 35 or locating members 37.

The above described procedure is particularly well adapted for use with photomechanical reproduction, say plural negative color photographs.

Another procedure embraced within the scope of the instant invention is that commonly known as step and repeat. More specifically, the procedure involves the use of a single sheet successively shifted or stepped to different positions on a reference surface for plural printing, engraving or other reproduction of the sheet on the reference surface. One embodiment of this is illustrated in Fig. 13, wherein 55c designates a reference surface, such as the sensitized surface of a zinc plate in photoengraving; and 60 designates a sheet to be located with reference to the surface 55c. By way of illustration, the sheet 60 is shown with a window 61 and a transparency 62 to be reproduced secured over the window by adhesive strips 63. A plurality of tabs 20c, each substantially identical to the tab 20 of Fig. 1, are regularly arranged on the sheet 60 and secured thereto, as by adhesive strips 46c. In the region of each tab 20c, the sheet 60 is cut away or open, so that the tab apertures communicate through the sheet. A locating button 35c is fixed on the surface 55c, and the sheet 60 is shifted to successively engage the button in the perforation 24c of each tab 20c. In order to properly arrange the tabs 20c, the sheet 60 may be superposed on the surface 55c in the desired relation, openings formed in the sheet spacedly receiving the buttons, and tabs secured over the openings conformably receiving the buttons. It is of course appreciated that Fig. 13 is broken away and that a similar series of tabs and another locating button are preferably employed on the other side of the window 61. As the sheet 60 is successively moved in the direction of the arrow, to engage the locating button 35c in each successively lower tab 20c, the sheet window 61 will successively expose the plate portions 64, 65 and 66; and, the tab perforations 21c will provide register marks on the plate surface 55c in proper relation with respect to each of the exposed plate portions.

Although register marks may be photographically produced by the tab perforations 21 and 21c, as noted hereinbefore, it will be seen that the locating buttons 35 and 35c serve to automatically close or block out the tab apertures 24 and 24c.

Of course, the method described hereinbefore may be employed to locate a wide variety of sheets, such as drawings to be photographed. In the latter case, the register tabs and locating buttons are preferably of white material, or other color inconspicuous on the particular drawing; and a contrasting material is placed behind the tabs so that the perforations 21 photographically produce register marks on the negative.

From the foregoing, it is seen that the present invention provides a method of locating sheets, and apparatus for use therein, which fully accomplish their intended objects, and are well adapted to meet practical conditions of manufacture and use.

Although the present invention has been described in some detail by way of illustration and example for purposes of clarity of understanding, it is understood that certain changes and modifications may be made within

What is claimed is:

1. The method of locating sheets, which method comprises: securing a first perforate tab to a first sheet, passing a positioning member conformably through said first tab, superposing a second sheet on said first sheet in desired relation with respect to the latter, forming an opening in said second sheet overlying said first tab and receiving said positioning member, and securing a second perforate tab over the opening in said second sheet conformably receiving said positioning member, said sheets being separable from each other upon removal of said tabs from said positioning member and replaceable in said desired relation upon reengagement of said positioning member in said tabs.

2. The method according to claim 1, further characterized by fixing to a reference surface, a locating member conformably engageable in said tabs so that the tab of each sheet is selectively engageable on and removable from said locating member for simultaneously and sequentially locating said sheets in their desired relation on said reference surface.

3. The method of locating a sheet on a surface having a locating member thereon, said method comprising: superposing said sheet on said surface in a desired relation, forming an opening in said sheet spacedly receiving said locating member, and securing a perforate tab over the opening in said sheet and conformably receiving said positioning member, said sheet thus being separable from said surface upon removal of said tab from said locating member and replaceable on said surface in said desired relation upon reengagement of said locating member in said tab.

4. The method according to claim 3, further characterized by forming a series of additional openings in said sheet, and securing a series of additional perforate tabs over said openings, respectively, so that successive engagement of said tabs on said locating member serves to step said sheet to different positions on said surface.

5. The method according to claim 3, further characterized by forming at least two openings in said sheet for spacedly receiving a pair of locating members on said surface, and securing a pair of perforate tabs over said openings, respectively, conformably receiving said locating members.

6. The method of locating sheets, which method comprises: securing a first pair of perforate tabs to a first sheet in spaced relation with respect to each other, passing a pair of positioning members conformably through said first pair of tabs, superposing a second sheet on said first sheet in a desired relation with respect to the latter, and securing a second pair of perforate tabs to said second sheet conformably receiving said positioning members, said sheets being separable from each other upon removal of said tabs from said positioning members and replaceable in said desired relation upon reengagement of said positioning members in said tabs.

7. The method according to claim 6, further characterized by fixing a pair of locating members to a reference surface, so that the tabs of each sheet are selectively engageable on and removable from said pair of locating members for simultaneously and sequentially locating said sheets in their desired relation on said surface.

8. The method according to claim 6, further characterized by arranging and fixing a pair of locating members on a sensitized plate for conforming engagement in the perforations of said first and second pairs of tabs when said first and second sheets are superposed on said plate, thereby closing said perforations during photographic exposure of said plate through said sheets.

9. The method of locating sheets, which method comprises: securing a first pair of perforate tabs to a first sheet with the perforations of said tabs in registry with register marks on said first sheet, passing a pair of positioning members conformably through said first pair of tabs, superposing a second sheet on said first sheet in registry with the latter, and securing a second pair of perforate tabs to said second sheet conformably receiving said positioning members, said sheets being separable from each other upon removal of said tabs from said positioning members and replaceable in registry with each other upon reengagement of said positioning members in said tabs.

10. The method of locating sheets, which method comprises: securing a first pair of perforate tabs to a first sheet, forming openings in said first sheet in the regions of said tabs, passing a pair of positioning members conformably through said first pair of tabs, superposing a second sheet on said first sheet in a desired relation with respect to the latter, forming openings in said second sheet overlying said first pair of tabs and receiving said positioning members, and securing a second pair of perforate tabs to said second sheet over the openings in the latter and conformably receiving said positioning members, said sheets being separable from each other upon removal of said tabs from said positioning members and replaceable in said desired relation by reengagement of said positioning members in said tabs.

11. The method according to claim 10, further characterized by fixing a pair of locating members to a reference surface, so that the tabs of each sheet are selectively engageable on and removable from said pair of locating members for simultaneous and sequential location of said first and second sheets in their desired relations on said surface.

12. Sheet locating apparatus comprising a pair of positioning member base plates, an upstanding rib on each of said base plates, an upstanding boss on each of said base plates spaced from the rib thereon, a plurality of tabs fabricated of relatively stiff but bendable sheet material and adapted for attachment in pairs to sheets to be located, said tabs each being formed with an opening and a perforate register mark adapted to snugly receive a boss and rib, respectively, on one base plate to locate said sheets relative to each other, and a pair of buttons each snugly engageable in the openings of said tabs and adapted for attachment to a reference surface in spaced relation corresponding to the spacing of said tab openings, whereby said tabs are selectively engageable on and removable from said buttons for locating said sheets on said reference surface.

13. Sheet locating apparatus comprising a pair of positioning member base plates, an upstanding rib on each of said base plates, an upstanding boss on each of said base plates spaced from the rib thereon, a plurality of tabs fabricated of relatively stiff but bendable sheet material and adapted for attachment in pairs to sheets to be located, said tabs each being formed with an opening and a perforate mark adapted to snugly receive a boss and rib, respectively, on one base plate to locate said sheets relative to each other, and a pair of buttons each snugly engageable in the openings of said tabs and adapted for attachment to a reference surface in spaced relation corresponding to the spacing of said tabs, whereby said tabs are selectively engageable on and removable from said buttons for locating said sheets on said reference surface.

14. The method of locating sheets, which method comprises: securing a first perforate tab to a first sheet, passing a positioning member conformably through said first tab, superposing a second sheet on said first sheet in desired relation with respect to the latter, and securing a second perforate tab to said second sheet in position conformably receiving said positioning member, said sheets being separable from each other upon removal of said tabs from said positioning member and replaceable in said desired relation upon re-engagement of said positioning member in said tabs.

15. The method according to claim 14, further characterized by fixing to a reference surface a locating member conformably engageable in said tabs so that the tab of each sheet is selectively engageable on and removable from said locating member for simultaneously and sequentially locating said sheets in their desired relation on said reference surface.

References Cited in the file of this patent

UNITED STATES PATENTS 2,711,031   Kessler ---------------- June 21, 1955